Patented Feb. 3, 1942

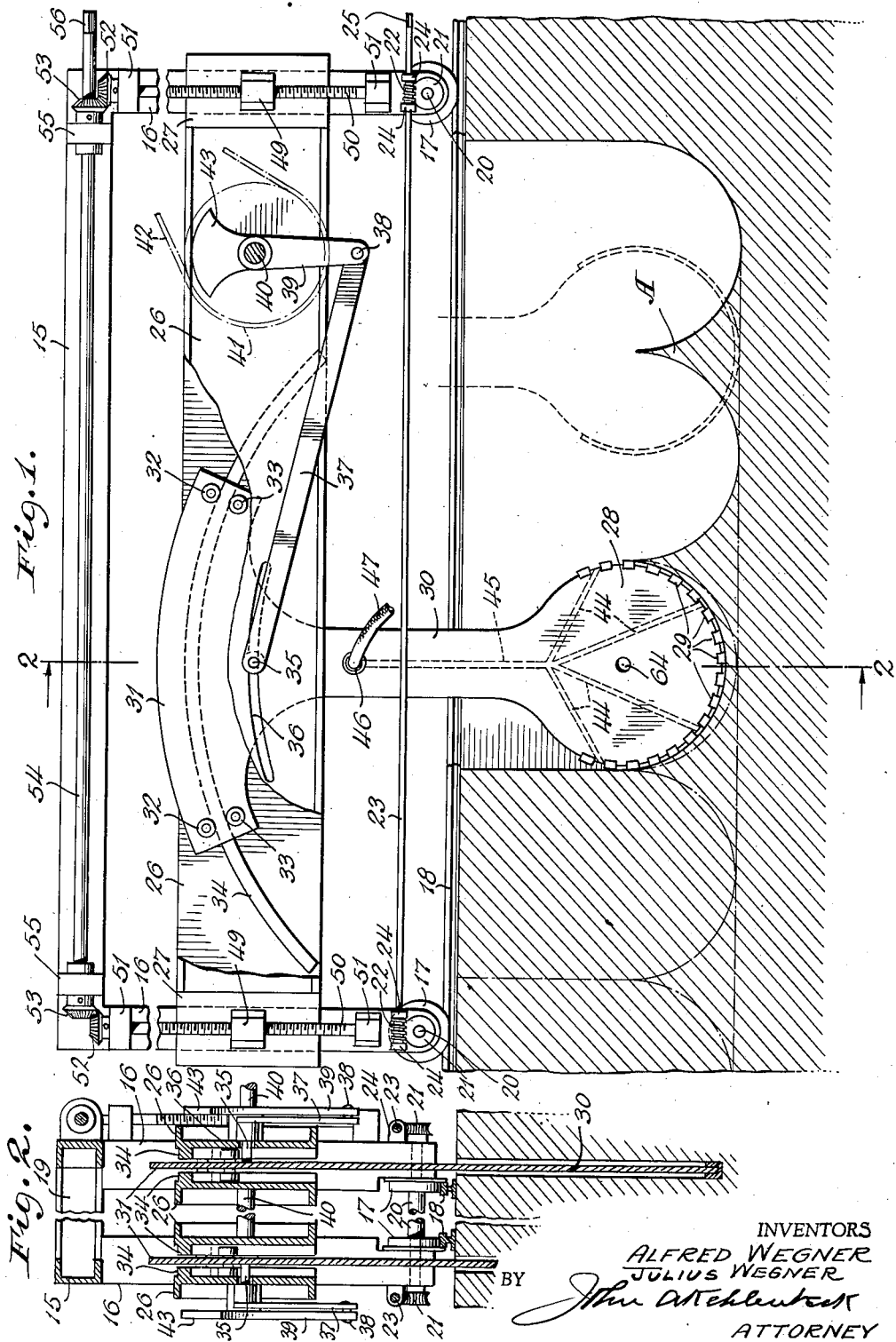

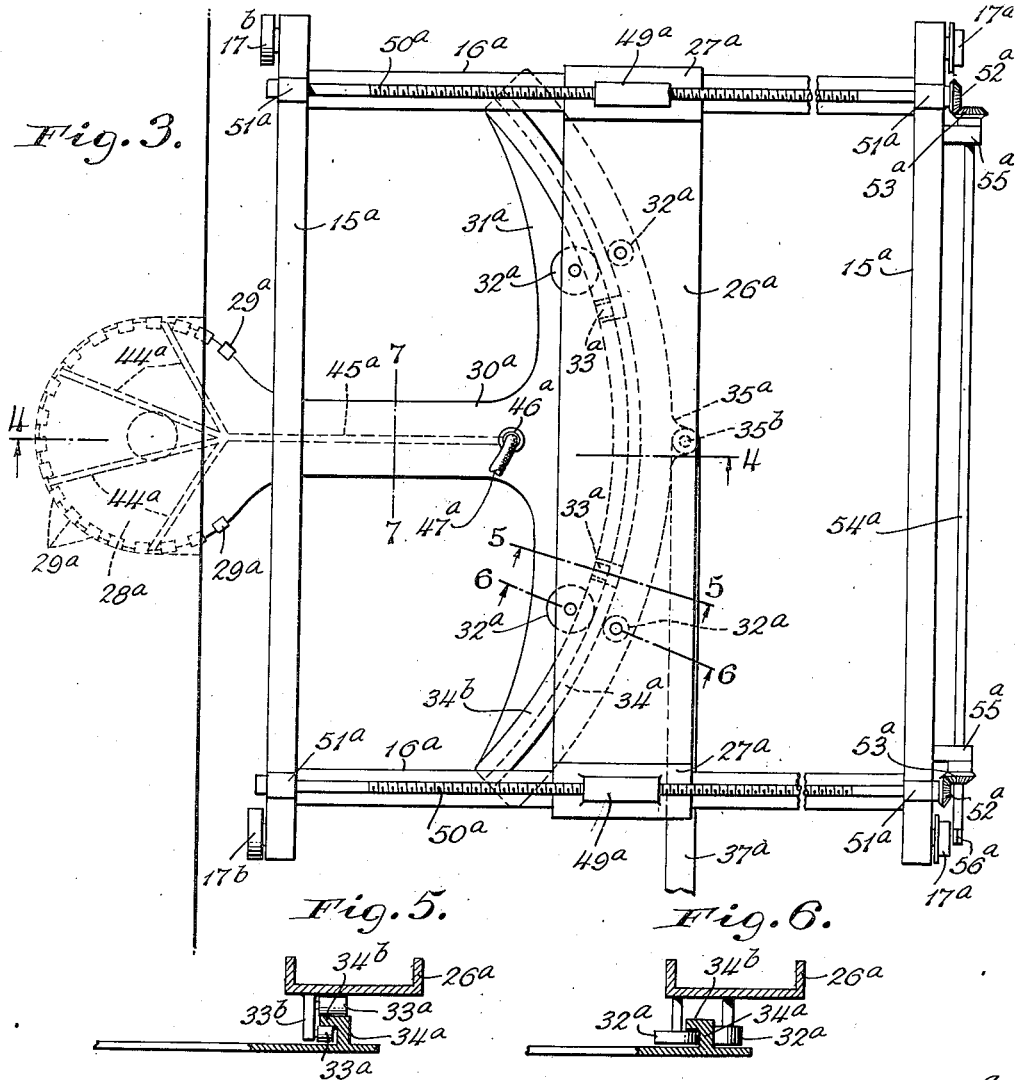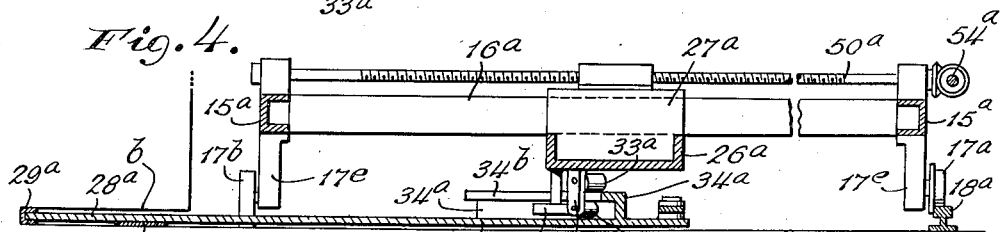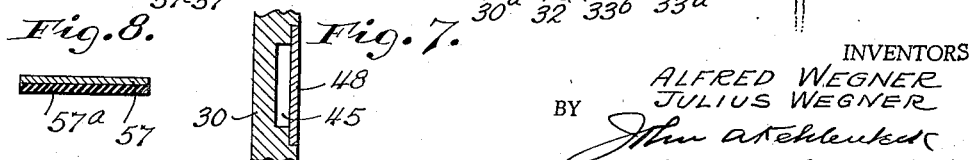

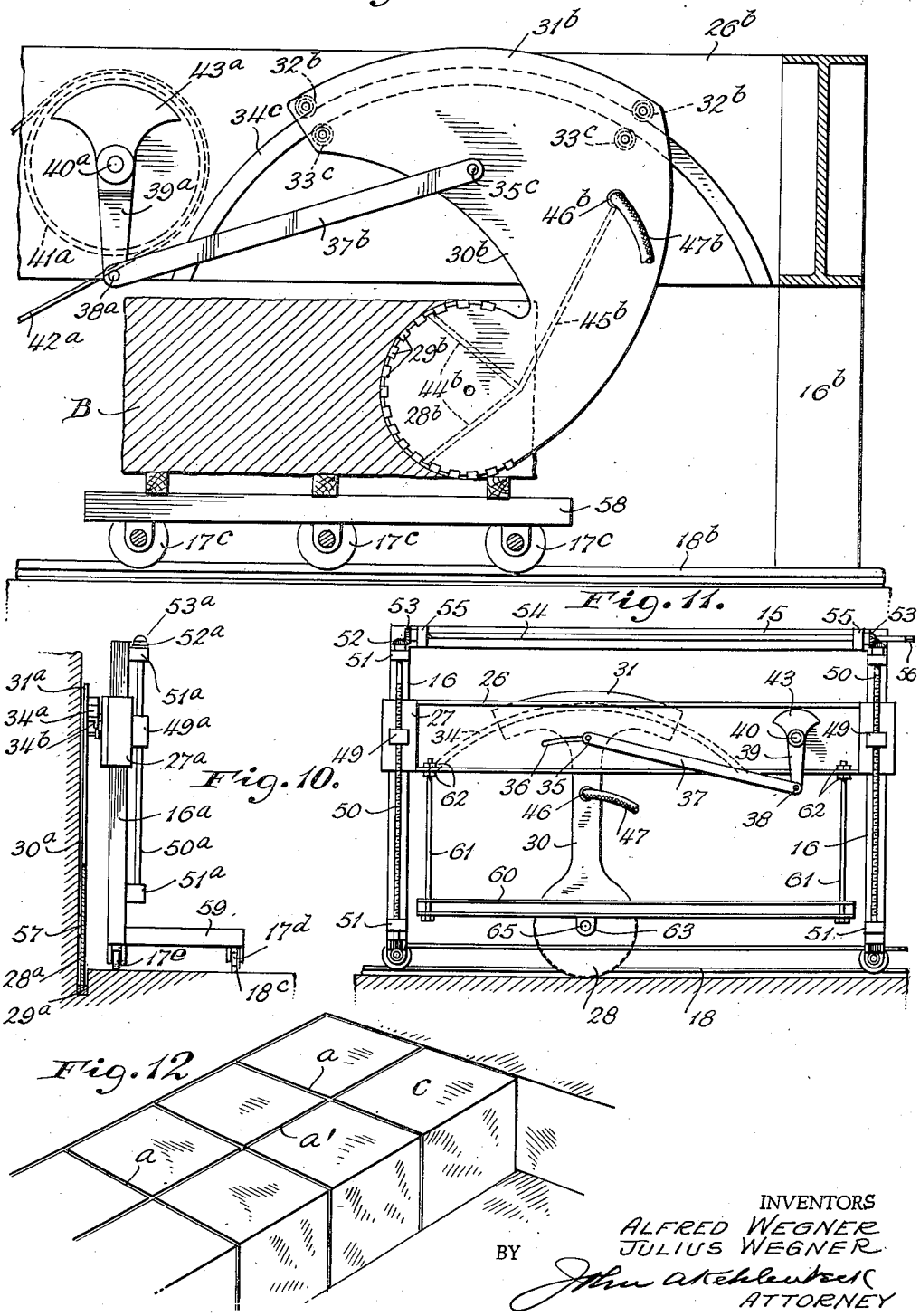

2,271,905

UNITED STATES PATENT OFFICE 2,271,905

METHOD OF AND DEVICE FOR CUTTING STONE AND OTHER MATERIALS

Alfred Wegner and Julius Wegner, Flushing, N. Y.

Application July 10, 1940, Serial No. 344,660

16 Claims. (Cl. 125—19)

The invention relates to methods of and devices for cutting materials and more particularly to methods of and devices for cutting stone, and has for its object to provide a novel and simple method of cutting materials with maximum efficiency and at relatively high speed. The invention contemplates primarily the provision of a novel cutting method for use in quarrying stone in an efficient and expeditious manner with a minimum of difficulty and waste. A further object of the invention is the provision of a novel cutting device for carrying out the novel method with a maximum of efficiency. Other more specific objects will appear from the description hereinafter and the features of novelty will be pointed out in the claims.

In the accompanying drawings, which illustrate several examples of the novel cutting devices without defining the limits of the invention, Fig. 1 is a side elevation of the novel cutting device in operation in a stone quarry; Fig. 2 is a vertical section on the line 2—2 of Fig. 1; Fig. 3 is a plan view of another form of the cutting device in operation in a stone quarry; Fig. 4 is a sectional view on the line 4—4 of Fig. 3; Figs. 5 and 6 are detail sections on the lines 5—5 and 6—6 respectively of Fig. 3; Fig. 7 is an enlarged fragmentary section on the line 7—7 of Fig. 3; Fig. 8 is an enlarged detail view of a bearing disk which may form part of the device shown in Figs. 3 and 4; Fig. 9 is an elevation of another form of the cutting device in the act of cutting a block of stone; Fig. 10 is an end elevation of another form of the cutting device designed for cutting in close proximity to stone surfaces in the operation of quarrying; Fig. 11 is an elevation on a reduced scale of the cutting device shown in Fig. 1 illustrating a stabilizing means which may be used in connection with said cutting device at the start of a cutting operation, and Fig. 12 is a diagrammatic perspective view of a stone quarry illustrating the cutting operations of the novel device.

When used for quarrying stone or other materials, the novel method consists in oscillating a curvilinear cutting edge around its center of oscillation, exerting pressure on the curvilinear cutting edge while in contact with the material to be cut, actuating the oscillating cutting edge from a point which is at a distance from said center of oscillation of the cutting edge and progressively advancing the cutting blade as the cutting action thereof proceeds. In practice a multiplicity of successive vertical and horizontal cuts are made by means of an oscillating cutting blade, the length or depth of each cut being substantially equal to the diameter of the cutting blade and the width of each cut being substantially equal to the curvilinear cutting edge of said blade. The scallops remaining from each of said cuts are removed by moving the cutting blade at the deepest setting in directions transverse to said cuts already made thereby freeing the blocks of stone or other material from the foundation.

In the form of the novel cutting device shown in Figs. 1 and 2 which is designed primarily to operate as a vertical cutter for simultaneously effecting a plurality of spaced vertical cuts, the said cutting device includes a plurality of supporting frames each consisting of a horizontal channel iron or equivalent member 15 and depending upright members 16 supported upon flanged rollers 17 arranged to travel on guide rails 18 for maintaining the device in a predetermined path of travel. Cross members 19 suitably arranged in the desired numbers connect the respective supporting frames with each other in any convenient manner to provide a unitary structure as illustrated in Fig. 2; it will be understood that the cutting device being described may in some instances consist of a single cutting unit in which case the cross members 19 may be omitted. In any event the rollers 17 are fixed upon shafts 20 suitably journalled at the lower ends of the upright members 16 and carrying worm gears 21 arranged in mesh with worm pinions 22 fixed upon operating shafts 23. The latter are rotatably mounted in bearings 24 suitably mounted upon or forming part of the upright members 16, said shafts 23 being rotated in any suitable manner to operate the worm pinions 22, worm gears 21 and rollers 17 to shift the position of the cutting device on the rails 18 at will; for instance, as shown, the ends of said shafts 23 may be squared or otherwise formed as indicated at 25 for the accommodation of a suitable tool for manually operating said shafts 23.

Each unit of the cutting device shown in Figs. 1 and 2 further includes a pair of rails 26 located in spaced registering surface parallelism carried by blocks 27 slidably mounted on the upright members 16 as illustrated in Fig. 1. In addition each unit of the cutting device includes cutting means consisting of a circular cutting blade 28 provided on its periphery with cutting teeth 29 of any conventional type suitable for cutting stone and fixed in place on the blade 28 in any convenient manner. The blade 28 forms part of a carrying member exemplified by an arm or member 30 which terminates in a preferably arcuate plate 31 curved about the center of the blade 28 and provided with co-operating groups of rollers 32 and 33 located upon opposite faces of the plate 31 preferably near opposite ends thereof as shown in Fig. 1. The rollers 32 and 33 are in rolling engagement respectively with the upper and lower surfaces of curved tracks 34 projecting toward each other from the opposed faces of each pair of associated rails 26, as illustrated in Fig. 2. The tracks 34 are curved on a radius from the center of the cutting blade 28 and in the novel arrangement are located upon opposite sides of the arcuate plate 31 so that the latter projects between said tracks 34 which accordingly constitute curved guide rails in concentric relation to said center of the cutting blade 28 for the rollers 32 and 33. The plate 31 is reciprocated in the curved path defined by the tracks 34 to rock the cutting blade 28 about its center and thereby cause the teeth 29 to develop a cutting action on the stone. Any suitable mechanism may be provided for operating the cutting means in the intended manner. For instance, as shown, a pin 35 may project from the outer face of the plate 31 through a slot 36 formed in the outer associated rail 26 and curved about the center of the blade 28 in curved parallelism with the tracks 34. A connecting link 37 has its one end pivotally mounted on the pin 35 and has its other end pivotally connected at 38 with a crank-arm 39 fixed upon a shaft 40 rotatably mounted on the rails 26. When the cutting device as shown in Fig. 2 includes a plurality of cutting means, the shaft 40 preferably is common to all of the cutting means and in such case preferably carries additional crank-arms 39 connected by means of corresponding connecting links 37 with the respective plates 31 in the manner described above. The shaft 40 may be driven in any convenient manner as by means of a pulley 41 fixed thereon and connected by means of a belt 42 with a conventional motor or other suitable source of power; to facilitate the driving operation each crank-arm 39 may be provided with a counter-weight 43. In order to increase the operative efficiency of the cutting blades 28, each blade is provided with channels 44 communicating with a main channel 45 and terminating at the periphery of the blade 28. The main channel 45 leads to a nipple 46 or the like on the arm 30 and adapted to receive one end of a flexible hose 47 whereby said channels are connected with a source of water supply. With this arrangement the blade 28 may be supplied with water through the channels 44 and 45, which water in combination with a conventional abrasive supplied in any conventional manner increases the cutting action of said blade 28. The channels 44 and 45 may conveniently be provided by producing surface recesses in the arm 30 and blade 28 and then covering said recesses by means of plates 48 suitably fixed in place as shown in Fig. 7.

For vertically and progressively adjusting each cutting blade 28 and its associated parts as the cutting proceeds and to reset the blade to normal position, the blocks 27 are provided with internally threaded nuts 49 fixed in place thereon in screwthreaded engagement with upright adjusting screws 50. The latter are rotatably mounted against axial displacement in bearings 51 carried by the upright members 16 and at their upper ends are provided with bevel gears 52 in mesh with associated bevel gears 53 secured upon an operating shaft 54. The latter is rotatably mounted in bearings 55 on the horizontal member 15 and is operated in any convenient manner, and for this purpose may have its free end squared as shown at 56, or otherwise shaped for the accommodation of a crank or other suitable operating implement. Where the device consists of a plurality of cutting units as illustrated in Fig. 2 provision is preferably made for operating all of the adjusting screws 50 although this is not necessary if the several cutting units included in one cutting device operate independently of each other as obviously may be the case.

In the form illustrated in Figs. 3 to 6 inclusive, which is designed primarily to operate as a horizontal cutter, the novel cutting device comprises channel members or the like 15ª and associated members 16ª secured together in any convenient manner to constitute a rectangular supporting frame. The frame is movably supported on rollers 17ª and 17ᵇ rotatably mounted on lugs 17ᶜ depending from the members 15ª, at least one set of rollers for instance the rollers 17ª being preferably flanged and arranged to travel on a guide rail 18ª for maintaining the device in a predetermined path of travel. The form of the device being described further includes a rail 26ª carried by blocks 27ª slidably mounted on the members 16ª and provided with cooperating groups of rollers 32ª located in associated pairs in spaced relation and rotating about vertical axes as illustrated in Figs. 3 and 6; in addition groups of rollers 33ª are mounted in pairs in associated spaced relation on lugs 33ᵇ depending from the rail 26ª to rotate about horizontal axes as shown in Figs. 4 and 5.

The cutting means included in the form of the novel device illustrated in Figs. 3 to 6 inclusive consists of a circular cutting blade 28ª provided on its periphery with cutting teeth 29ª of any conventional type suitable for cutting stone and fixed in place on the blade 28ª in any convenient manner. As in the form first described the blade 28ª forms part of a carrying member exemplified by an arm or member 30ª which likewise terminates in a preferably arcuate plate 31ª having its outer edge at least curved about the center of the blade 28ª. A rib 34ª curved on a radius from the center of the blade 28ª projects from a face of the blade 28ª and is provided with a flange 34ᵇ to constitute a channelled curved track in concentric relation to said center of the blade 28ª and corresponding to the tracks 34 of Figs. 1 and 2. The curved track is movably mounted between the rollers 32ª and 33ª with the rollers 32ª in rolling engagement with the opposite faces of the rib 34ª and the rollers 33ª in rolling contact with the opposite faces of the flange 34ᵇ as shown respectively in Figs. 6 and 5.

As in the form first described any suitable mechanism may be provided for operating the cutting means of the form under discussion. For instance, as shown in Fig. 3, the plate 31ª may be provided with a lug 35ª with which one end of a connecting link 37ª is pivotally connected at 35ᵇ, the other end of said link 37ª being pivotally connected with a crank arm corresponding to the crank arm 39 of Fig. 1 and mounted and operated in the same way.

Channels 44ª terminating at the periphery of the blade 28ª and communicating with a main channel 45ª are provided in the blade 28ª and arm or member 30ª, said channel 45ª leading to a nipple 46ª or the like on the arm 30ª and adapted to receive one end of a flexible hose 47ª whereby said channels are connected with a supply source of water. The channels 44ª and 45ª may be formed in the blade 28ª and arm 30ª in the same way as described with respect to Fig. 1 and serve the same purpose as the channels 44 and 45 thereof.

For progressively adjusting the blade 28ª and its associated parts as the cutting proceeds and to reset the blade 28ª to its normal position, the blocks 27ª are provided with internally threaded nuts 49ª fixed in place thereon in screwthreaded engagement with adjusting screws 50ª. The latter are rotatably mounted against axial displacement in bearings 51ª carried by the members 15ª and are provided with bevel gears 52ª in mesh with associated bevel gears 53ª secured upon an operating shaft 54ª. This shaft 54ª is journalled in bearings 55ª on the one member 15ª and is operated in any convenient manner, and for this purpose may have its free end squared as shown at 56ª or otherwise shaped for the accommodation of a suitable operating implement.

If desirable or found necessary in any given cutting operation, the blade 28ª may be provided with a bearing disk arranged to fit into the clearance formed by the teeth 29ª and to rest upon the lower surface of the cut made thereby. This bearing disk preferably consists of a plate of steel or other metal 57 and a pad of rubber 57ª secured in surface engagement with said plate 57 in any convenient manner. The disk is secured upon the lower face of the blade 28ª in any suitable way preferably in concentric relation with the center thereof and with the rubber pad 57ª in resting engagement with the adjacent surface of the stone in the cut as shown in Fig. 4. In practice this disk constitutes a bearing on which the blade 28ª is movable and which in co-operation with the water supplied through the channels 44ª facilitates the operation of the blade 28ª and maintains the cutting progress thereof in the desired manner.

The novel cutting device is shown in Fig. 9 in a form designed primarily for cutting stone slabs, it being understood that the specific cutting blade and its associated elements may be incorporated in a cutting device for cutting in a quarry with equal efficiency.

As illustrated in Fig. 9, the cutting device comprises a frame consisting of a horizontal rail 26ᵇ supported on upright members 16ᵇ which, in the illustrated example, are stationary and occupy a fixed position. The cutting means in the form shown in Fig. 9 consists of a circular cutting blade 28ᵇ provided on its periphery with cutting teeth 29ᵇ of any conventional type suitable for cutting stone and secured in position on the blade 28ᵇ in any convenient manner. The blade 28ᵇ is arranged in an upright position for operation in a horizontal direction to produce vertical cuts and projects laterally from an arm 30ᵇ of which it forms an integral part. The arm 30ᵇ extends over and above the blade 28ᵇ and terminates in a preferably arcuate plate 31ᵇ which in association with said arm 30ᵇ constitutes a carrying member for the cutting blade 28ᵇ, said arcuate plate 31ᵇ carrying rollers 32ᵇ and 33ᶜ arranged in associated pairs upon its one face as shown in Fig. 9. The rollers 32ᵇ and 33ᶜ are in rolling engagement respectively with the upper and lower surfaces of a curved track 34ᶜ located on one face of the rail 26ᵇ and curved on a radius from the center of the cutting blade 28ᵇ in concentric relation to said center. The mechanism whereby the cutting means is actuated in the intended manner may, as shown, consist of a connecting link 37ᵇ having its one end pivotally connected at 35ᶜ with the arm 30ᵇ and its other end pivotally connected at 38ª with a crankarm 39ª fixed upon a shaft 40ª rotatably mounted on the rail 26ᵇ and provided with a counter-weight 43ª as in the form first described. The shaft 40ª may be driven in any convenient manner as by means of a pulley 41ª fastened on the shaft 40ª and connected by means of a belt 42ª with a conventional motor or other source of power. In order to increase the operative efficiency of the cutting means the blade 28ᵇ may be provided with channels 44ᵇ communicating with a main channel 45ᵇ and terminating at the periphery of the blade 28ᵇ. The main channel 45ᵇ leads to a nipple 46ᵇ or the like on the arm 30ᵇ and adapted to receive one end of a flexible hose 47ᵇ whereby said channels are connected with a source of water supply. The channels 44ᵇ and 45ᵇ may correspond to and conveniently be produced in the same way as described with respect to the channels 44 and 45 of Fig. 1. As shown in Fig. 9, a truck 58 mounted on flanged wheels or rollers 17ᶜ arranged to travel on guide rails 18ᵇ is provided for supporting the stone slab to be cut and for shifting the latter relatively to the cutting blade 28ᵇ as the cutting operation proceeds.

The novel cutting device illustrated in Fig. 10 is designed to operate in proximity to upright surfaces as exemplified by upright walls of a quarry in which the quarrying has progressed inwardly, for the purpose of effecting subsequent vertical cuts as continuations of previously made vertical cuts. The device under discussion may correspond in construction to the form shown in Figs. 3 and 4 but operating in an upright instead of a horizontal position. For this purpose the rectangular supporting frame is carried in an upright position on rollers 17ᵈ and 17ᵉ, the former being mounted on a horizontal member 59 projecting from the supporting frame and travelling on a guide rail 18ᶜ. In all other respects the device shown in Fig. 10 may correspond to the one illustrated in Figs. 3 and 4.

For the purpose of stabilizing the cutting blade and its operation at the start of a given cutting operation the device may be provided with a readily removable stabilizing means as shown for instance in Fig. 11. In the illustrated example the stabilizing means consists of a stabilizing member or rail 60 suspended from and removably connected with the rail 26 by means of elongated bolts 61 and nuts 62. The arrangement is such that the member or rail 60 extends across the face of the blade 28 in close proximity thereto, with a depending apertured lug 63 of said rail 60 in registry with an aperture 64 formed in the blade 28 at the center thereof as shown in Fig. 1. When the stabilizing means is in use a removable bolt 65 is inserted through the registering apertures of the lug 63 and blade 28 respectively to thereby provide the latter with a stabilizing axis on which said blade 28 is operatively rocked in the operation of cutting the stone. After the preliminary cutting has proceeded into the stone sufficiently to steady the blade 28, the stabilizing means may be removed by removing the bolt 65 and disconnecting the elongated bolts 61 from the rail 26 to avoid interference with the completion of the cutting operation. While the stabilizing means is shown in association with a cutting device of the type shown in Figs. 1 and 2, it obviously may be similarly combined with other forms of the novel cutting device to function in the same way.

In practice in utilizing the novel device for quarrying stone, the guide rails 18 of Fig. 1 are laid upon the surfaces of the stone to be cut, in proper position thereon to guide the cutting device to progressively different positions for the purpose of making the vertical cuts $a$ shown in Fig. 12 and after these cuts have been completed, the position of the device is changed to produce the vertical cuts $a'$ extending at right angles to the cuts $a$, as illustrated in Fig. 12. At the start of the operation the rails 26 occupy a raised position on the upright members 16 with the circular cutting peripheries of the blades 28 in engagement with the surface of the stone at the point where the initial cuts are to be made. At this stage, the stabilizing means shown in Fig. 11 is detachably fastened in place on the device with the bolts 65 inserted through the registering apertures of the lugs 63 and blades 28 respectively, to thereby provide the latter with stabilizing axes to maintain said blades in position and to prevent undesirable vibration or other movements thereof. The shaft 40 is then operated by means of the belt 42 and pulley 41 to rotate the crank arms 39 and to thereby operate the connecting links 37 in a manner to oscillate the blade carrying members exemplified by the arms or members 30 and arcuate plates 31 and to reciprocate the rollers 32 and 33 on the curved tracks 34. As these tracks are concentric to the center of the cutting peripheries of the blades 28 the latter will be rocked about said centers to correspondingly rock the cutting peripheries of said blades in contact with the stone being cut. During these operations, water is supplied through the flexible hose 47 and channels 45 and 44 of the respective blades 28 and at the same time an abrasive substance is supplied in any conventional manner at the cutting points to facilitate the cutting action of said blades. As the aforesaid rocking of the latter takes place about the centers of said cutting peripheries, the latter by abrasive action on the stone will gradually produce a cut therein. By periodically manipulating the operating shaft 44 to rotate the adjusting screws 50, the latter in cooperation with the nuts 49 will adjust the rails 26 downwardly on the upright members 16 to correspondingly adjust the cutting blades 28 relatively to the stone to thereby progressively advance the cutting action of said blades thereon. The operation of the device is continued until the cutting blades have produced vertical cuts of maximum depth after which the rails 26 are restored to their raised positions and the device is shifted on the guide rails 18 by operating the shaft 23 and worm gearing 21, 22 to locate the cutting peripheries of the blades 28 in position for producing a second vertical cut in contiguous relation to the one previously completed. These operations are continued until the desired number of contiguous vertical cuts have been produced by the blades 28. At this stage a plurality of upwardly directed scallops A of stone remain at the bottom of the cuts as illustrated in Fig. 1. These scallops A are removed by rocking the blades about their centers while said blades occupy their lowest positions as indicated by dotted lines in Fig. 1 and concurrently shifting the device along the guide rails 18 by operating the shaft 23 and worm gearing 21, 22.

When the total number of vertical cuts $a$ and $a'$ have been completed in the area of stone being cut, a key block of stone is removed in any suitable manner to provide a space for the accommodation of the horizontal cutting device shown in Figs. 3 and 4. Previous to placing this cutting device in said space the guide rail 18 has been placed in position in said space so as to define an operating path along which the device may be shifted to different cutting positions. In its operative location the rollers 17$^a$ are in rolling engagement with the rail 18$^a$ while the rollers 17$^b$ rest upon the stone bottom of the space from which the aforesaid key block has been removed. The rail 26$^a$ occupies a position on the members 16$^a$ in which the cutting periphery of the blade 28$^a$ is in contact with the vertical surface of the stone at the point where cutting is to begin. The carrying member for the blade 28$^a$ exemplified by the arm 30$^a$ and arcuate plate 31$^a$ is then oscillated as in the previous form to thereby reciprocate the curved track consisting of the rib 34$^a$ and flange 34$^b$ on the rollers 32$^a$ and 33$^a$. As the curved track is concentric to the center of the blade 28$^a$ the latter will be rocked about said center to correspondingly rock its cutting periphery in contact with the stone to produce a horizontal cut therein. As the cutting proceeds, the rail 26$^a$ will be adjusted lengthwise of the member 16$^a$ by manipulating the operating shaft 54$^a$ to correspondingly adjust the blade 28$^a$ and to advance the cutting action of said blade on the stone. The device is shifted and adjusted in a manner corresponding to the form first described and produces a plurality of contiguous horizontal cuts corresponding to the vertical cuts thus illustrated in Fig. 1. During the cutting operations, water is supplied to the blade 28$^a$ to the hose 47$^a$ and the channels 45$^a$ and 44$^a$ and an abrasive substance is likewise supplied in the same way as previously set forth herein. The scallops corresponding to the scallops A of Fig. 3, which remain after the desired number of contiguous cuts have been made by the blade 28$^a$, are likewise removed by operating said blade at its innermost position with respect to said cuts and concurrently adjusting the device along the guide rail 18$^a$. After the horizontal cuts $b$ have been completed and the scallops of stone have been removed, the stone may be removed from the quarry in the form of the rectangular blocks $c$ shown in Fig. 12.

As shown in Fig. 10, a cutting device corresponding in construction and operation to the one illustrated in Figs. 3 and 4 may be utilized and operated in an upright position to cause the cutting blade 28$^a$ to produce vertical cuts adjacent to an upright surface of the stone in the next lower strata of stone to be cut from the quarry. The operation of this form of the device corresponds to that of the form just described.

In Fig. 9 the cutting device is shown in the operation of cutting a stone slab B which is supported in any conventional manner upon a truck 58 mounted to travel along the guide rails 18$^b$. In this form the shaft 40$^a$ is operated for instance by means of the belt 42$^a$ and pulley 41$^a$ to rotate the crank arm 39$^a$ and thereby through the medium of the connecting link 37$^b$ to oscillate the blade carrying member exemplified by the arm 30$^b$ and arcuate plate 31$^b$. As this oscillation of the carrying member takes place, the rollers 32$^b$ and 33$^c$ will be reciprocated on the curved track 34$^c$ which is concentric to the center of the cutting periphery of the blade 28$^b$. The latter accordingly will be rocked on the center of oscillation of said cutting periphery to correspondingly rock the blade 28$^b$ in contact with the stone slab B as illustrated in Fig. 9. As the cutting operation proceeds, the truck 58 is shifted on the rails 18$^b$ to adjust the stone slab B relatively to said blade and to thereby progressively advance the cutting action of said cutting periphery on said stone slab B. The cutting operation is continued until the stone slab B has been cut into separate sections or otherwise as may be desired.

It will be understood that the cutting blade 28$^b$ and its associated elements may be incorporated in a machine in which the supporting rail 26$^b$ is adjustable as in Fig. 1 to permit the type of blade and associated elements illustrated in Fig. 9 to be used for cutting stone from the quarry as described with respect to the device shown in Figs. 1 and 2.

In all of its forms the cutting device is simple in construction and operation, and of maximum efficiency without the necessity for any particularly skilled supervision. The operation of cutting stone and particularly cutting stone from a quarry is thereby reduced to the simplest form and avoids objections inherent in existing methods of quarrying such as, for instance, the provision of set backs, as is now necessary, when employing channeling machines.

The device is basically a novel mechanism which imparts an oscillating or rocking motion to the cutting edge of the cutting tool as represented by the respective cutting segments 28, 28$^a$, or 28$^b$. While the cutting segments oscillate around centers, such as 64, Fig. 1, which are ordinarily unsupported, the oscillating motion originates and is developed from a point which may be any desired distance away from the center of oscillation. This needs no further illustration, because the connecting arm, such as 30, Fig. 1, may obviously be made of any size to vary the distance from the point of actuation of the mechanism to the center of oscillation of cutting segment 28.

In other words, the action of this device may be compared to that of a roating circular saw having a radius corresponding to the distance from the center of oscillation 64 of the cutting segment 28 to the curvilinear tracks 34, Fig. 1. It will be noted that this center 64 is actually the fixed point of the cutting system despite the fact that it itself has ordinarily no shaft or bearing to fix its location; this center 64, therefore, may be said to be anchored in the air.

It must be realized that in practice cuts of 6′, 8′, 12′ or more in depth must be made in stone quarries. Such cuts could heretofore only be made with channeling machines which consist basically of a multiplicity of long chisels which are gradually driven into the stone under power. Especially when qarrying marble, the stone is stunned by the blows of the chisels, and consequently its structure is ruined to a considerable depth, and it is impossible to distinguish color shades of the marble without first removing the damaged surface layer on a machine, such as a gang saw, for instance. Apart from the great expense involved in handling and cutting these very heavy stone blocks, this procedure also entails considerable wastage.

Channeling also requires provision of set-backs for each successive vertical layer of blocks, because the mechanism for actuating the chisels does not permit a continuation of a vertical cut such as shown in Fig. 10, for instance. It is obvious that the positive action of the instant novel cutting method not only produces clean cuts involving as waste only the width of the cutting teeth, but will also maintain the cutting direction regardless of whether or not the stone formation is of uniform hardness. The stone blocks are mostly used in square or rectangular shapes for further fabrication. There is, therefore, a considerable waste in the subsequent fabrication of stones which have been quarried by methods known heretofore. This not only involves wastage, but considerable additional freight charges from the quarry to the fabricator's plant.

Besides channeling, use has also been made heretofore of so-called wire-saws for quarrying stone. This method is slow and consists of cutting the stone usually by means of three strands of wire stranded together to have an approximate diameter of ¼″. The wire runs over vertically adjustable pulleys and sand is used as a cutting agent. The disadvantages of this method are that the wire strands frequently break and, due to the abrasion of the wire during cutting, the diameter of the wire decreases as the cutting operation progresses; hence, when a wire breaks, the cutting operation must be started practically all over again. Pockets or fissures in the stone frequently permit the cutting agent (sand) to become lost; soft and hard spots in the rock formation will deflect the wire to such an extent as to make a straight cut impossible.

The present invention eliminates all these disadvantages with the simplest means. It will be understood that any kind of desired oscillating movement, such as a dwelling movement or vibratory movement may be obtained with the device illustrated. For simplicity sake only simple oscillating movements following substantially an arc have been shown, but it is evident that any other desired movement of the cutting segment may be produced by shaping the track 34 and its counterparts accordingly.

Various changes in the specific forms shown and described may be made within the scope of the claims without departing from the spirit of the invention.

We claim:

1. A cutting device of the character described, comprising a curvilinear cutting blade having a center of oscillation, connecting means extending from said cutting blade and being in fixed relation thereto, means for oscillating said connecting means to cause in turn oscillation of said cutting blade around its center of oscillation to effect the cutting action on the work material, and means concentric to said center of oscillation for controlling the oscillation of said blade on said center.

2. A cutting device of the character described, comprising a circularly shaped cutting segment in contact with the material to be cut, said cutting segment having a center of oscillation, an arm extending from said segment, oscillating means for oscillating said arm and hence said segment, and guiding elements for said arm concentric to said center of oscillation of said cutting segment.

3. A cutting device of the kind described comprising a circular cutting blade, and means for rocking said blade about its center in contact with the material being cut, and means concentric to said center of the blade for controlling the rocking thereof.

4. A cutting device of the kind described comprising a blade having a curved cutting periphery, means for rocking said blade about the center of said cutting periphery with the latter in contact with the material being cut, controlling means concentric to said center of the cutting periphery for controlling said rocking of the blade, and means for adjusting said controlling means and cutting blade relatively to said material to progressively advance the cutting action of said blade thereon.

5. In a cutting device for cutting stone, the combination of a cutting blade having a circular cutting periphery, means for rocking said blade about the center of said cutting periphery with the latter in contact with the stone being cut, a curved track concentric to the center of said cutting periphery, and rollers in rolling engagement with said track and cooperating therewith to control the rocking operation of said blade.

6. In a cutting device for cutting stone, the combination of a supporting frame, a supporting member mounted on said frame, a cutting blade having a circular cutting periphery, a carrying member for said blade, a curved track on one of said members in concentric relation to the center of said cutting periphery, rollers on the other member in rolling engagement with opposite surfaces of said track, and operating means connected with said blade carrying member for reciprocating the latter in the curve defined by said track whereby said blade is rocked about the center of said cutting periphery with the latter in contact with the stone being cut.

7. In a cutting device for cutting stone, the combination of supporting means, a rail mounted on said supporting means, a cutting blade having a circular cutting periphery, carrying means for said blade, a curved track on said rail in concentric relation to the center of said cutting periphery, rollers on said blade carrying means in rolling engagement with opposite surfaces of said track, and operating means connected with said carrying means for reciprocating said rollers on said track whereby said blade is rocked about the center of said cutting periphery with the latter in contact with the stone being cut.

8. In a cutting device for cutting stone, the combination of a movable supporting frame, a supporting member slidably mounted on said frame, a cutting blade having a circular cutting periphery, a carrying member for said blade, a curved track on one of said members in concentric relation to the center of said cutting periphery, rollers on the other members in rolling engagement with opposite surfaces of said track, operating means connected with said blade carrying member for reciprocating the latter in the curve defined by said track whereby said blade is rocked about the center of said cutting periphery with the latter in contact with the stone being cut, and adjusting means for slidably shifting said supporting member on said frame to adjust the blade relatively to said stone to progressively advance the cutting action of said cutting periphery thereon.

9. In a cutting device for cutting stone, the combination of a plurality of connected upright supporting frames, supporting rollers on which said frames are mounted, supporting rails slidably mounted on said frames for vertical movement thereon, a plurality of cutting blades having circular cutting peripheries, carrying members for said blades, curved tracks on said supporting rails in concentric relation to the centers of the cutting peripheries of said blades, rollers on the blade carrying members in rolling engagement with opposite surfaces of the associated tracks, operating means connected with said carrying members for reciprocating said rollers on said tracks whereby said blades are rocked on the centers of said cutting peripheries with the latter in contact with the stone being cut, and adjusting means for slidably shifting said supporting rails on said frames to adjust said blades relatively to said stone to progressively advance the cutting action of said cutting peripheries thereon.

10. In a cutting device for cutting stone, the combination of a movable horizontal supporting frame, a supporting rail slidably mounted on said frame, a cutting blade having a circular cutting periphery, a carrying member for said blade, a flanged curved track on said carrying member in concentric relation to the center of said cutting periphery, rollers mounted on said supporting rail in rolling engagement with the opposite surfaces of said track and the opposite surfaces of the flange thereof, operating means for reciprocating said track on said rollers whereby said blade is rocked on the center of said cutting periphery with the latter in contact with the stone being cut, and adjusting means for slidably shifting said supporting rail on said frame to adjust the blade relatively to said stone to progressively advance the cutting of said cutting periphery thereon.

11. In a cutting device for cutting stone, the combination of an upright supporting frame, a supporting rail on said frame, an upright laterally extending cutting blade having a circular cutting periphery, a carrying member for said blade extending over and above the same, a curved track on said supporting rail in concentric relation to the center of said cutting periphery, rollers on said blade carrying member in rolling engagement with opposite surfaces of said track, and operating means connected with said blade carrying member for reciprocating said rollers on said track whereby said blade is rocked on the center of said cutting periphery with the latter in contact with the stone being cut.

12. A cutting device of the character described, comprising curvilinear cutting means having a center of oscillation, means for rocking said cutting means about said center of oscillation, and controlling means concentric to said center of oscillation for controlling said rocking of the cutting means.

13. A cutting device of the character described, comprising a curvilinear cutting element having a center of oscillation, connecting means forming a rigid continuation of said cutting element, oscillating means for imparting an oscillating motion to said connecting means and in turn to said cutting element for effecting the cutting action of said cutting element on the work material, means concentric to said center of oscillation for controlling the oscillation of said cutting element, and means including channels in said cutting element for supplying liquid to said cutting element during the cutting operation.

14. A cutting device of the character described, comprising a curvilinear cutting element having a center of oscillation, connecting means forming a rigid continuation of said cutting element, oscillating means for imparting an oscillating motion to said connecting means and in turn to said cutting element for effecting the cutting action of said cutting element on the work material, and stabilizing means temporarily mounted on said device for stabilizing said cutting element at the start of the cutting operation and removable from said device after the cutting operation has progressed sufficiently to stabilize said cutting element.

15. In a cutting device for cutting stone, the combination of a cutting blade having a curved cutting periphery, means for rocking said blade about the center of said cutting periphery with the latter in contact with the stone being cut, a curved track concentric to the center of said cutting periphery, and guide members in movable engagement with said track and co-operating therewith to control the rocking operation of said blade.

16. In a cutting device for cutting stone, the combination of a movable support, a cutting blade having a curved cutting periphery adjustably mounted on said support, means for operating said blade to produce contiguous cuts into the stone to form a continuous cut transverse to said contiguous cuts, the inner ends of the latter being curved correspondingly to said cutting periphery whereby a plurality of scallops are formed at spaced intervals at the bottom of said continuous transverse cut, and means for adjusting said cutting blade relatively to said stone to progressively advance the cutting action thereof in the production of the contiguous cuts, said support being movable in the direction of said continuous transverse cut and said blade being concurrently operated at the bottom of said cut to progressively remove said scallops therefrom.

ALFRED WEGNER.
JULIUS WEGNER.